(12) United States Patent
Sakaue et al.

(10) Patent No.: US 11,815,069 B2
(45) Date of Patent: Nov. 14, 2023

(54) MAIN BEARING REPLACEMENT METHOD FOR WIND TURBINE POWER GENERATION FACILITY

(71) Applicant: MITSUBISHI HEAVY INDUSTRIES, LTD., Tokyo (JP)

(72) Inventors: Tatsuya Sakaue, Tokyo (JP); Tomokazu Yamada, Tokyo (JP); Yosuke Midorikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 41 days.

(21) Appl. No.: 17/551,358

(22) Filed: Dec. 15, 2021

(65) Prior Publication Data
US 2023/0049543 A1  Feb. 16, 2023

(30) Foreign Application Priority Data
Aug. 12, 2021 (JP) .................................. 2021-131501

(51) Int. Cl.
*F03D 80/70* (2016.01)
*F03D 13/20* (2016.01)
*F03D 15/10* (2016.01)
*F03D 80/50* (2016.01)

(52) U.S. Cl.
CPC ............. *F03D 80/70* (2016.05); *F03D 13/20* (2016.05); *F03D 15/10* (2016.05); *F03D 80/50* (2016.05); *F05B 2230/80* (2013.01); *F05B 2240/50* (2013.01); *F16C 2360/31* (2013.01)

(58) Field of Classification Search
CPC ............. F16C 2360/31; F05B 2240/50; F05B 2230/70; F05B 2230/80; F03D 13/20; F03D 15/10; F03D 80/50; F03D 80/70
See application file for complete search history.

(56) References Cited

U.S. PATENT DOCUMENTS 7,282,808 B2   10/2007  Shibata et al.
2016/0090966 A1*  3/2016  Kullin ...................... F03D 1/06
                                                   416/174
2021/0396271 A1* 12/2021  Hager ..................... F16C 17/10

FOREIGN PATENT DOCUMENTS

EP      1674762 B1   11/2004
JP      4031747 B2    1/2008
JP   2013076441 A     4/2013

OTHER PUBLICATIONS

Office Action for Japanese Application No. 2021-131501 dated Oct. 18, 2022; 2pp.

* cited by examiner

*Primary Examiner* — Moshe Wilensky
(74) *Attorney, Agent, or Firm* — KANESAKA BERNER AND PARTNERS LLP

(57) ABSTRACT

In a main bearing replacement method for a wind turbine power generation facility including a nacelle, a rotor head rotatably supported by the nacelle, a drive shaft to which rotation of the rotor head is transmitted, a main bearing disposed between the rotor head and the nacelle, and a coupling connecting the rotor head and the drive shaft on a radially inner side of the main bearing, the wind turbine power generation facility includes a main bearing sleeve fitted and fixed to an inner ring of the main bearing and mounted with the rotor head, and the main bearing is replaced at least while the main bearing sleeve is fitted and fixed to the inner ring of the main bearing.

14 Claims, 13 Drawing Sheets

MAIN BEARING REPLACEMENT METHOD FOR WIND TURBINE POWER GENERATION FACILITY

RELATED APPLICATIONS

The present application claims priority from Japanese Application Number 2021-131501 filed Aug. 12, 2021, the disclosure of which is hereby incorporated by reference herein in its entirety.

TECHNICAL FIELD

The present disclosure relates to a main bearing replacement method for a wind turbine power generation facility.

BACKGROUND

Patent Document 1 discloses a wind turbine for wind power generation including a nacelle installed on a tower, a main shaft mounted with wind turbine rotating blades, a gear box to increase rotation of the main shaft and output it, and a generator driven by an output of the gear box. In such a wind turbine for wind power generation, the main shaft is connected to the input shaft end of the gear box, and rotational torque is transmitted from the main shaft to the input shaft end. The main shaft is supported by the nacelle via a single double-row roller bearing. The double-row roller bearing receives the radial, axial, and bending loads applied to the main shaft it supports.

CITATION LIST

Patent Literature

Patent Document 1: JP4031747B

SUMMARY

However, Patent Document 1 does not disclose a method for replacing the double-row roller bearing that supports the main shaft in the nacelle. The problem is how to replace the double-row roller bearing (main bearing).

The present disclosure was made in view of the above problem, and an object thereof is to provide a main bearing replacement method for a wind turbine power generation facility whereby it is possible to efficiently replace the main bearing.

To accomplish the above object, in a main bearing replacement method for a wind turbine power generation facility according to the present disclosure including a main bearing disposed between a rotor head and a nacelle, and a coupling connecting the rotor head and a drive shaft on the radially inner side of the main bearing, the wind turbine power generation facility includes a main bearing sleeve fitted and fixed to an inner ring of the main bearing and mounted with the rotor head, and the main bearing is replaced at least while the main bearing sleeve is fitted and fixed to the inner ring of the main bearing.

With the main bearing replacement method for a wind turbine power generation facility of the present disclosure, since the main bearing is replaced at least while the main bearing sleeve is fitted and fixed to the inner ring of the main bearing, the main bearing can be efficiently replaced without removing the main bearing sleeve from the inner ring of the main bearing in midair.

DETAILED DESCRIPTION

A main bearing replacement method for a wind turbine power generation facility according to embodiments will now be described with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Overall Configuration of Wind Turbine Power Generation Facility)

Figure 1:
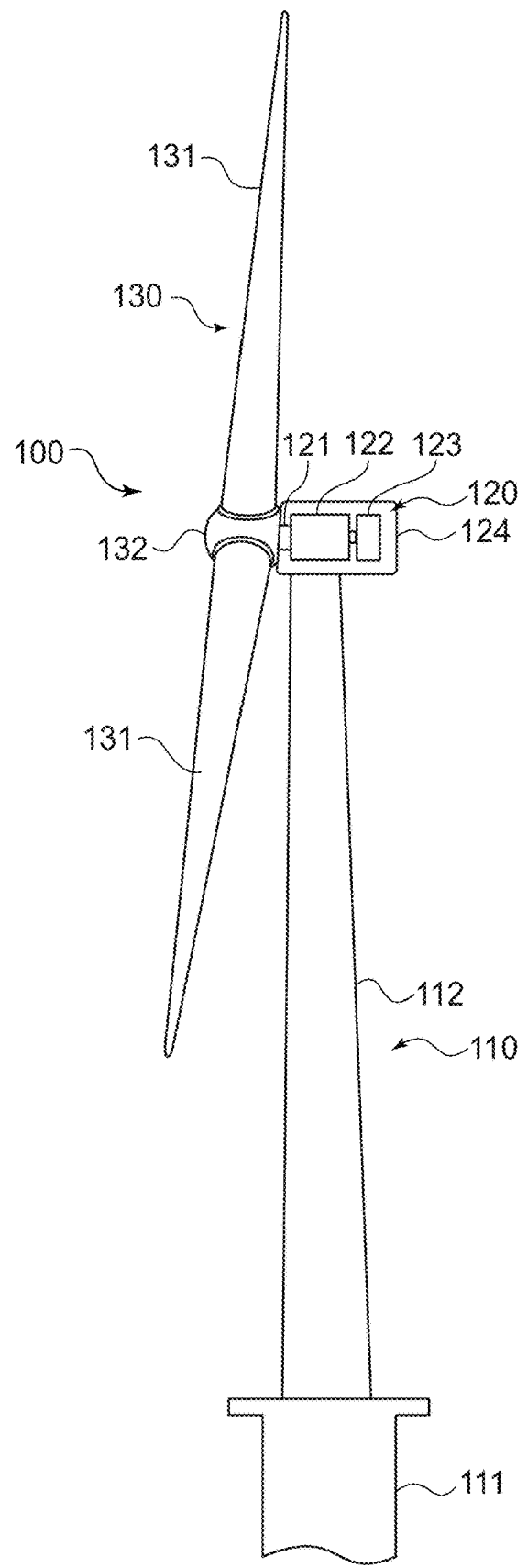
FIG. 1 is a schematic diagram of a wind turbine power generation facility according to an embodiment.

FIG. 1 is a schematic diagram of a wind turbine power generation facility 100 according to an embodiment.

As shown in FIG. 1, the wind turbine power generation facility 100 according to an embodiment is a propeller type wind turbine power generation facility and includes a structural support section 110, a generator section 120, and a rotor section 130. The structural support section 110 includes a foundation 111, a tower 112, and a yaw control device (not shown). The generator section 120 includes a drive shaft 121, a gear box 122, a generator 123, and a control device (not shown), and is housed in a housing called a nacelle 124. The rotor section 130 includes a wind turbine blade 131 and a rotor head 132. In the wind turbine power generation facility 100, rotation of the rotor head 132 is transmitted to the generator 123 to generate power.

(Configuration of Main Portion of Wind Turbine Power Generation Facility)

Figure 2:
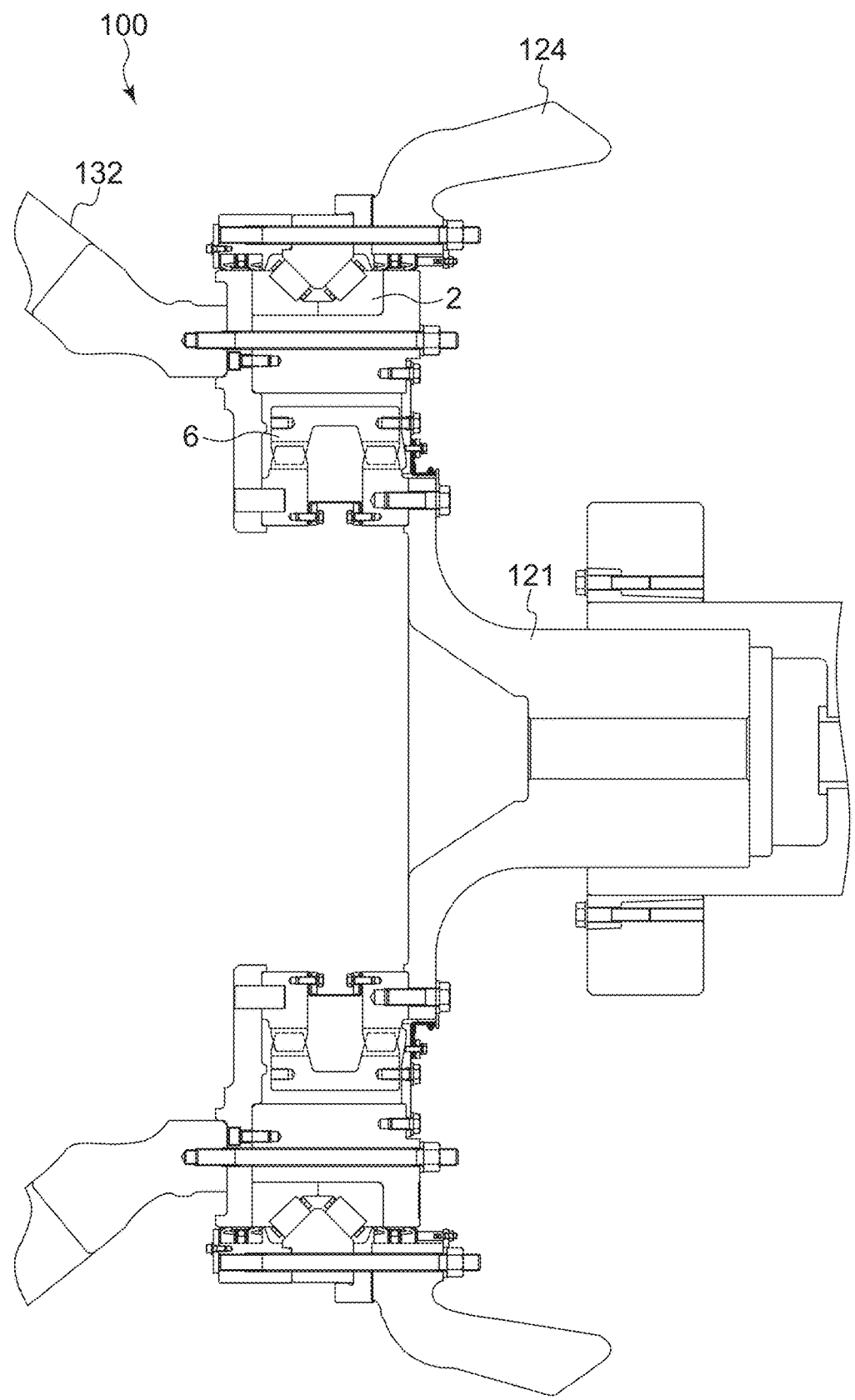
FIG. 2 is a schematic longitudinal cross-sectional view of the main portion of the wind turbine power generation facility shown in FIG. 1.
Figure 3:
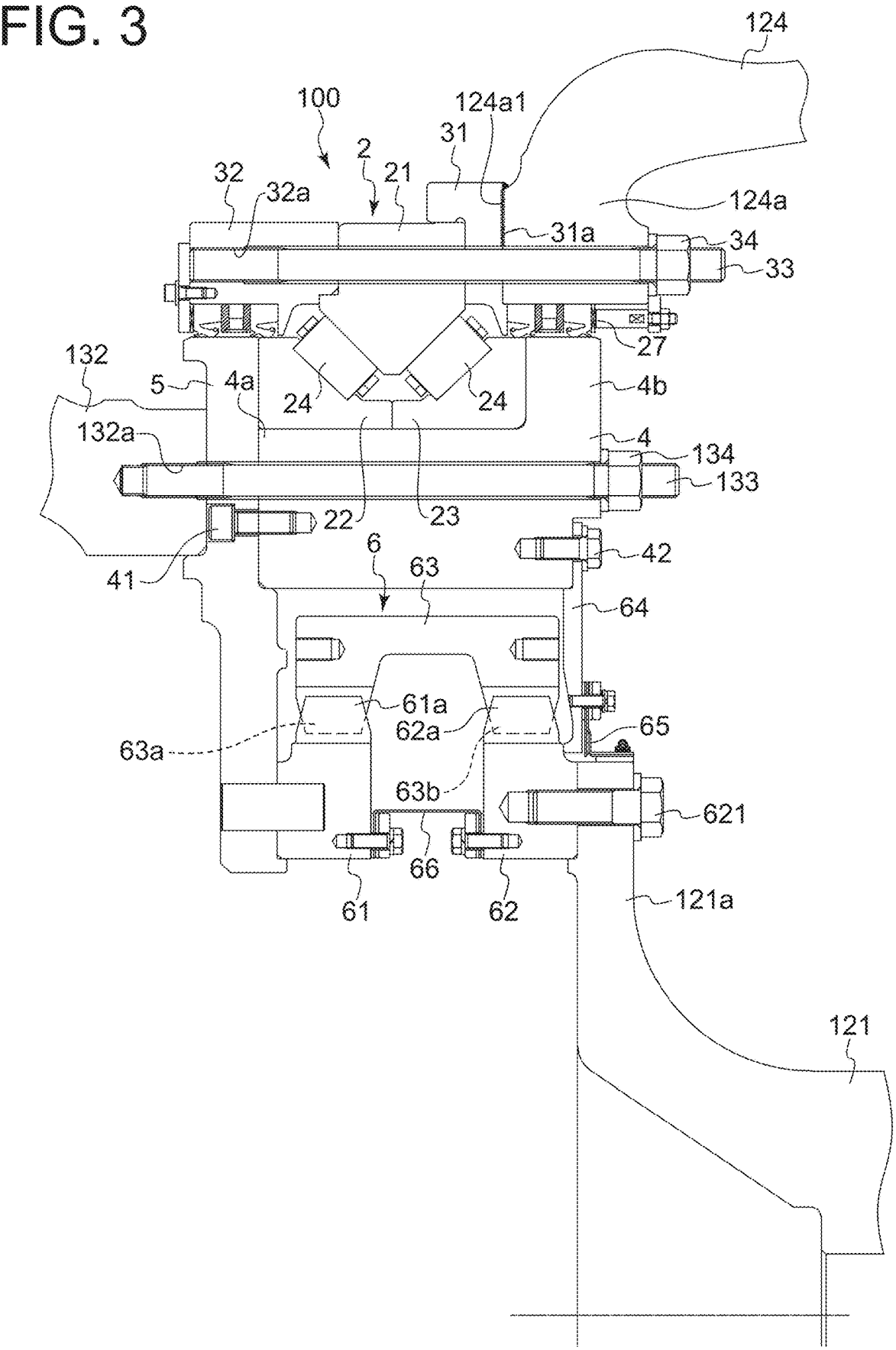
FIG. 3 is an enlarged view of the main bearing, coupling, and surrounding parts shown in FIG. 2.

FIG. 2 is a schematic longitudinal cross-sectional view of the main portion of the wind turbine power generation facility 100 shown in FIG. 1. FIG. 3 is an enlarged view of the main bearing, coupling, and surrounding parts shown in FIG. 2.

As shown in FIG. 2, the wind turbine power generation facility 100 according to an embodiment includes a nacelle 124, a rotor head 132 rotatably supported by the nacelle 124, and a drive shaft 121 to which rotation of the rotor head 132 is transmitted. A main bearing 2 is disposed between the rotor head 132 and the nacelle 124, and the rotor head 132 is rotatably supported by the nacelle 124. A coupling 6 is disposed on the radially inner side of the main bearing 2 and connects the rotor head 132 and the drive shaft 121 on the radially inner side of the main bearing 2.

As shown in FIG. 3, the main bearing 2 is, for example, a double-row roller bearing, and each of the rollers 24 is arranged between an outer ring 21 and an inner ring 22, 23 in a double row.

The outer ring 21 of the main bearing 2 is fitted and fixed to a pair of retainers 31, 32. Each of the retainers 31, 32 is annular. The outer ring 21 of the main bearing 2 is disposed between the pair of retainers 31, 32, and the outer ring 21 of the main bearing 2 is fitted and retained by the pair of retainers 31, 32.

Of the pair of retainers 31, 32, the retainer 31 closer to the nacelle (hereinafter referred to as "nacelle-side retainer 31") has a mounting surface 31a in contact with the nacelle 124. The mounting surface 31a is a flat surface along the direction perpendicular to the axis of the nacelle-side retainer 31, and is connected to a mounting surface 124a1 of a nacelle side surface portion 124a of the nacelle 124. The retainer 32 closer to the rotor head (hereinafter referred to as "rotor head-side retainer 32") has a plurality of bolt holes 32a. Each of the bolt holes 32a receives a stud bolt 33. The stud bolt 33 penetrates the outer ring 21 of the main bearing 2, the nacelle-side retainer 31, and the nacelle side surface portion (nacelle base plate) 124a of the nacelle 124 and is fitted and fixed to a nut 34, so that the main bearing 2 is secured to the nacelle 124.

A main bearing sleeve 4 is fitted and fixed to the inner rings 22, 23 of the main bearing 2. The main bearing sleeve 4 is annular and has a fixation portion 4a fitted and fixed to the inner rings 22, 23, and a flange portion 4b in contact with the end surface of the inner ring 23. For example, the main bearing sleeve 4 is fitted and fixed to the inner rings 22, 23 by shrink-fitting the inner rings 22, 23 to the main bearing sleeve 4.

An inner ring retainer 5 is fixed to the side surface of the fixation portion 4a of the main bearing sleeve 4. The inner ring retainer 5 has a plurality of countersunk holes. A cap bolt 41 is inserted in each of the countersunk holes and fitted to the bolt hole in the main bearing sleeve 4. Thus, the inner ring retainer 5 is fixed to the side surface of the fixation portion 4a of the main bearing sleeve 4.

For example, the space between the inner ring retainer 5 and the rotor head-side retainer 32 is sealed. The coupling 6 is disposed between the inner ring retainer 5 and the drive shaft 121 in the axial direction of the inner ring retainer 5.

The rotor head 132 is disposed at a side of the inner ring retainer 5 opposite to the main bearing sleeve 4. The rotor head 132 has a plurality of bolt holes 132a. The bolt holes 132a are arranged at equal intervals on the diameter centered on the axis of the rotor head 132. Each of the bolt holes 132a receives a stud bolt 133. The stud bolt 133 penetrates the inner ring retainer 5 and the main bearing sleeve 4 and is fitted to a nut 134, so that the rotor head 132 is secured to the main bearing sleeve 4. Thus, the main bearing 2 is disposed between the rotor head 132 and the nacelle 124, and the rotor head 132 is rotatably supported by the nacelle 124.

The coupling 6 is, for example, a gear coupling and has a pair of inner rings 61, 62 and an outer ring 63 that interconnects the pair of inner rings 61, 62. Each of the pair of inner rings 61, 62 is annular and has a gear 61a, 62a on the outer periphery. One of the pair of inner rings 61, 62 is fixed to the inner ring retainer 5.

The inner ring 62 is fixed to the drive shaft 121 by fitting a bolt 621.

The outer ring 63 is annular and has gears 63a, 63b on the inner periphery to mate with the gears 61a, 62a on each of the pair of inner rings 61, 62.

The drive shaft 121 is the input shaft of the gear box 122 (see FIG. 1). For example, it is formed in a trumpet shape that gradually expands from the gear box side to the coupling side (see FIG. 2), and the inner ring 62 is fixed to a coupling-side end portion 121a of the drive shaft 121.

A gear coupling holding plate 64 is disposed between the main bearing sleeve 4 and the inner ring 62. The gear coupling holding plate 64 is disposed to prevent the outer ring 63 from falling out of the pair of inner rings 61, 62 toward the drive shaft. The gear coupling holding plate 64 is annular and has a plurality of through holes on the outer periphery. Each of the through holes receives a bolt 42 such that the bolt 42 is fitted and fixed to the main bearing sleeve 4. As a result, the gear coupling holding plate 64 closes an annular opening between the main bearing sleeve 4 and the inner ring 62 to prevent the outer ring 63 from falling out of the pair of inner rings 61, 62 toward the drive shaft.

Between the gear coupling holding plate 64 and the coupling-side end portion 121a of the drive shaft 121, a coupling seal 65 is disposed. The coupling seal 65 is a coupling accessory and shields (seals) the coupling 6 from the outside. For example, the coupling seal 65 is formed in annular shape with an L-shaped cross-section, and shields the coupling 6 between the gear coupling holding plate 64 and the coupling-side end portion 121a of the drive shaft 121.

A bellows 66 is disposed between the pair of inner rings 61, 62. The bellows 66 is a coupling accessory and shields the coupling 6 from the outside in conjunction with the coupling seal 65. The bellows 66 is disposed on the radially inner side of the coupling 6, and the inside of the bellows 66 (coupling 6 side) is filled with grease.

An oil seal 27 is disposed between the outer ring 21 and the inner ring 23 of the main bearing 2. The oil seal 27 is a main bearing accessory and seals between the outer ring 21 and the inner ring 23 of the main bearing 2.

[Main Bearing Replacement Method for Wind Turbine Power Generation Facility]

A main bearing replacement method for a wind turbine power generation facility 100 according to an embodiment is to remove the main bearing 2 from the nacelle 124 and mounts a new main bearing 2 to the nacelle 124, and includes a disassembly step (step S1) of removing the main bearing 2 from the nacelle 124 (see FIG. 4) and an assembly step (step S3) of mounting a new main bearing 2 on the nacelle 124 (see FIG. 5).

[Main Bearing Replacement Method for Wind Turbine Power Generation Facility: Disassembly Step]

FIG. 4 are schematic flowcharts of the disassembly step (step S1) included in the main bearing replacement method for a wind turbine power generation facility 100 according to an embodiment. For the disassembly step (step S1), either one of the two disassembly steps (steps S1A and S2A) can be selected depending on the local conditions.

Figure 4A:
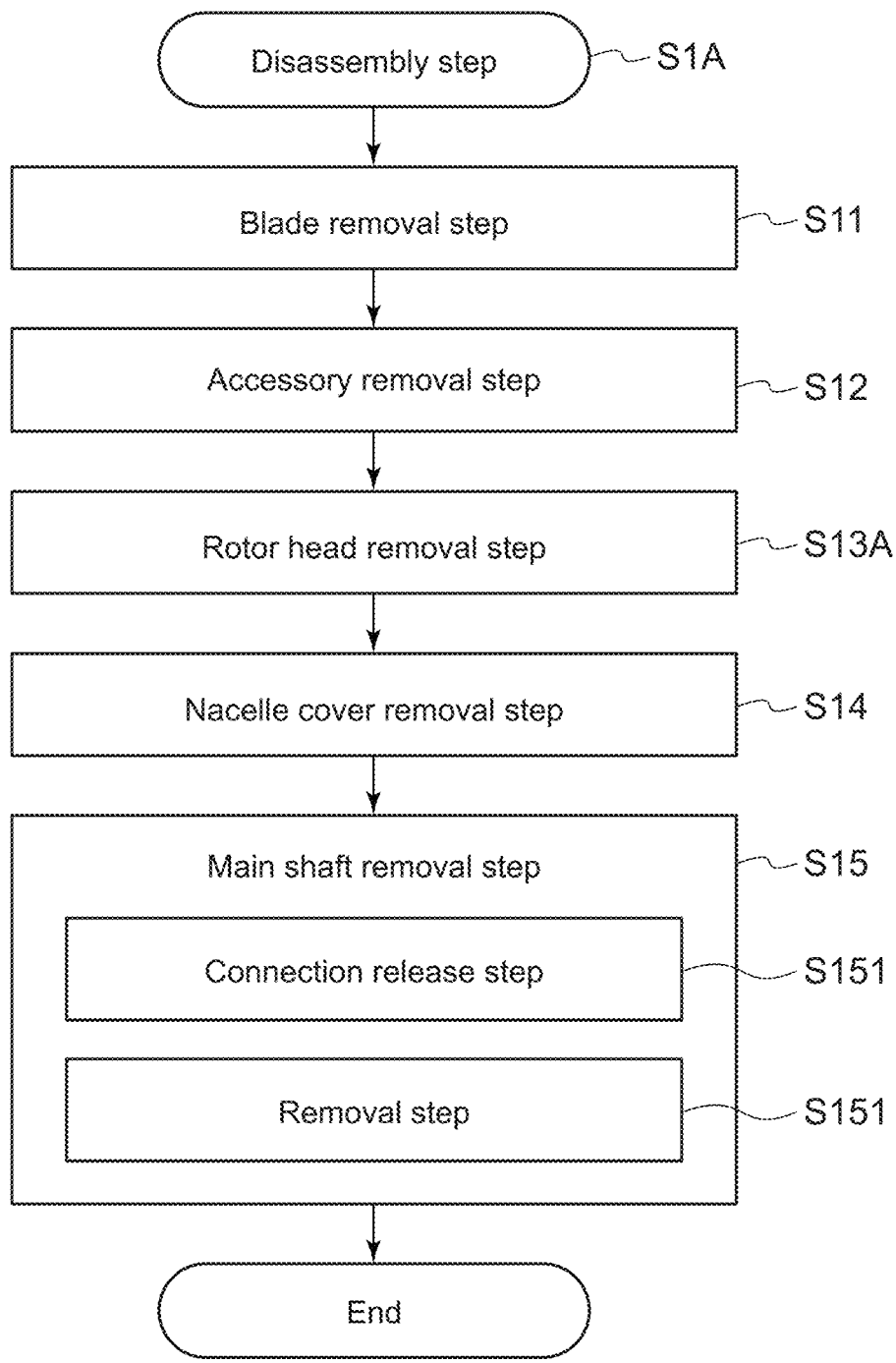
FIG. 4A is a schematic flowchart of the first disassembly step included in the main bearing replacement method for a wind turbine power generation facility according to an embodiment.

As shown in FIG. 4A, the first disassembly step (step S1A) includes a blade removal step (step S11), an accessory removal step (step S12), a rotor head removal step (step S13A), a nacelle cover removal step (step S14), and a main bearing removal step (step S15).

The blade removal step (step S11) is a step of removing the plurality of wind turbine blades 131 from the rotor head 132 sequentially. In the blade removal step (step S11), for example, the wind turbine blades 131 to be removed are rotated to a horizontal position and removed one by one using a dedicated blade lifting beam.

Figure 6:
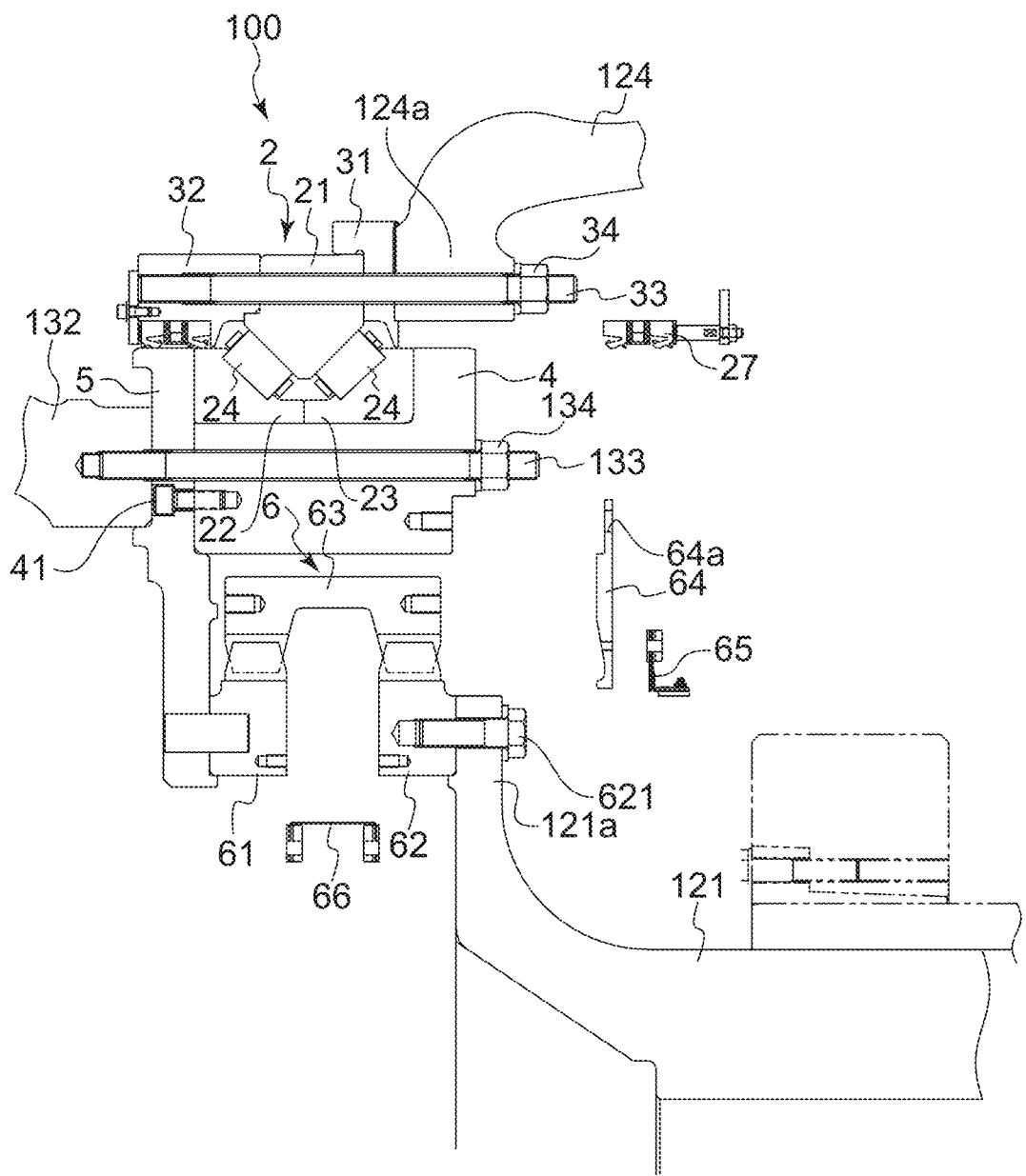
FIG. 6 is a diagram showing the state where the surrounding parts of the main bearing are removed from the wind turbine power generation facility (state before the surrounding parts of the main bearing are mounted on the wind turbine power generation facility).

The accessory removal step (step S12) is a step of removing a main bearing accessory from the main bearing 2 and removing a coupling accessory from the coupling 6. As shown in FIG. 6, the main bearing accessory includes the oil seal 27 sealing between the outer ring 21 and the inner ring 23 of the main bearing 2, and the coupling accessory includes the gear coupling holding plate 64, the coupling seal 65, and the bellows 66. In the accessory removal step (step S12), the oil seal 27 is removed, grease in the coupling is removed, and the gear coupling holding plate 64, the coupling seal 65, and the bellows 66 are removed.

Figure 7:
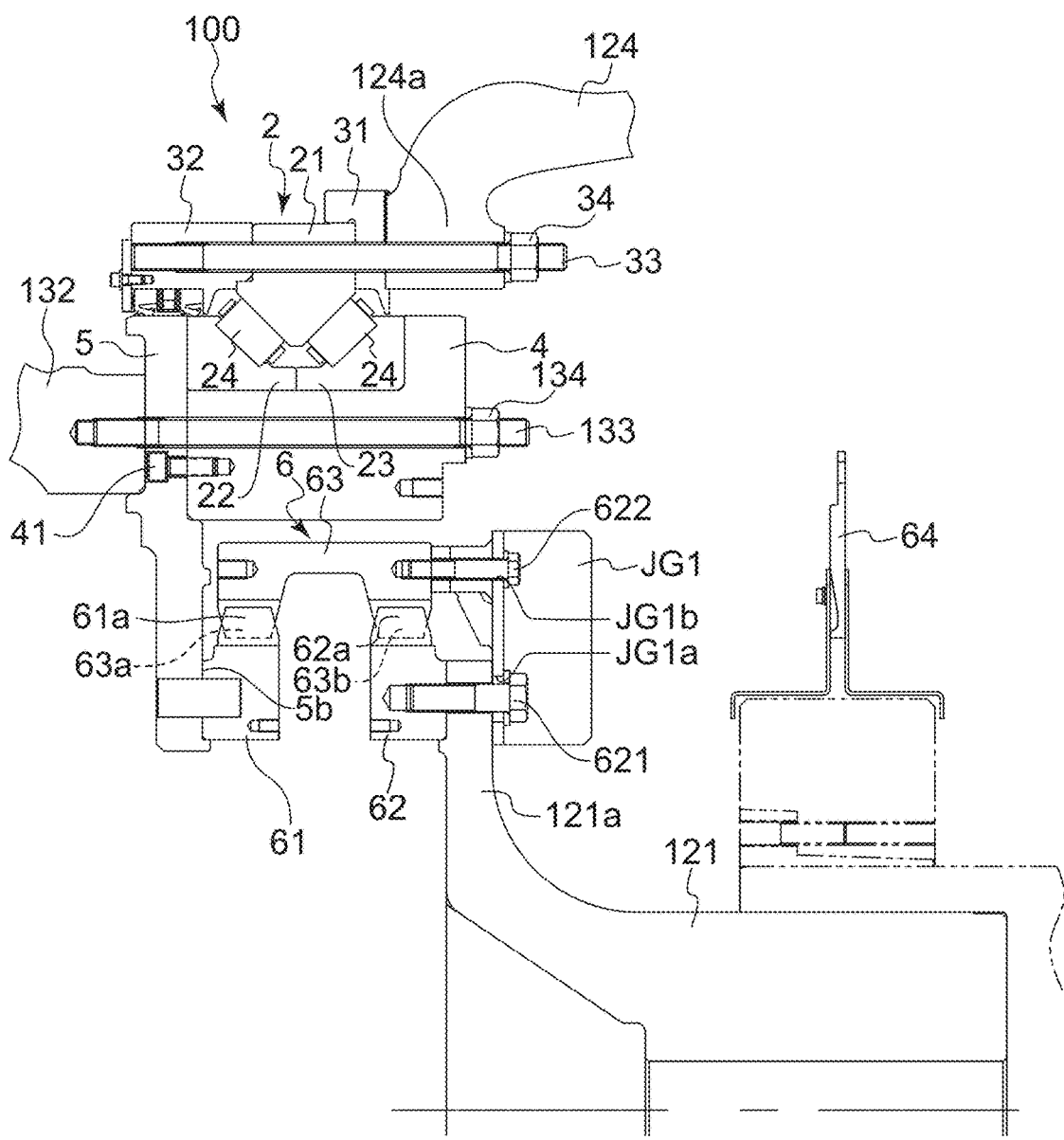
FIG. 7 is a diagram showing the state where the outer ring is fixed to the drive shaft-side inner ring in the wind turbine power generation facility.

Further, in the accessory removal step (step S12), the outer ring 63 is fixed to the inner ring 62 (hereinafter, referred to as "drive shaft-side inner ring 62") that is fixed to the drive shaft 121. For example, the outer ring 63 is fixed to the drive shaft-side inner ring 62 at four positions that divide the drive shaft-side inner ring 62 into four equal parts in the circumferential direction. For example, as shown in FIG. 7, the outer ring 63 and the drive shaft-side inner ring 62 are fixed by a jig JG1 connecting the outer ring 63 and the drive shaft-side inner ring 62. The jig JG1 is composed of, for example, an angle with an L-shaped cross-section. A bolt 621 that passes through a through hole JG1a at one end of the jig JG1 is fitted and fixed to a bolt hole 62b in the drive shaft-side inner ring 62, and a bolt 622 that passes through a through hole JG1b at the other end of the jig JG1 is fitted and fixed to a bolt hole in the outer ring 63, so that the outer ring 63 is fixed to the drive shaft-side inner ring 62. The bolt hole 62b in the drive shaft-side inner ring 62 is also used as the bolt hole 62b for fixing the drive shaft-side inner ring 62 to the drive shaft 121.

Figure 8:
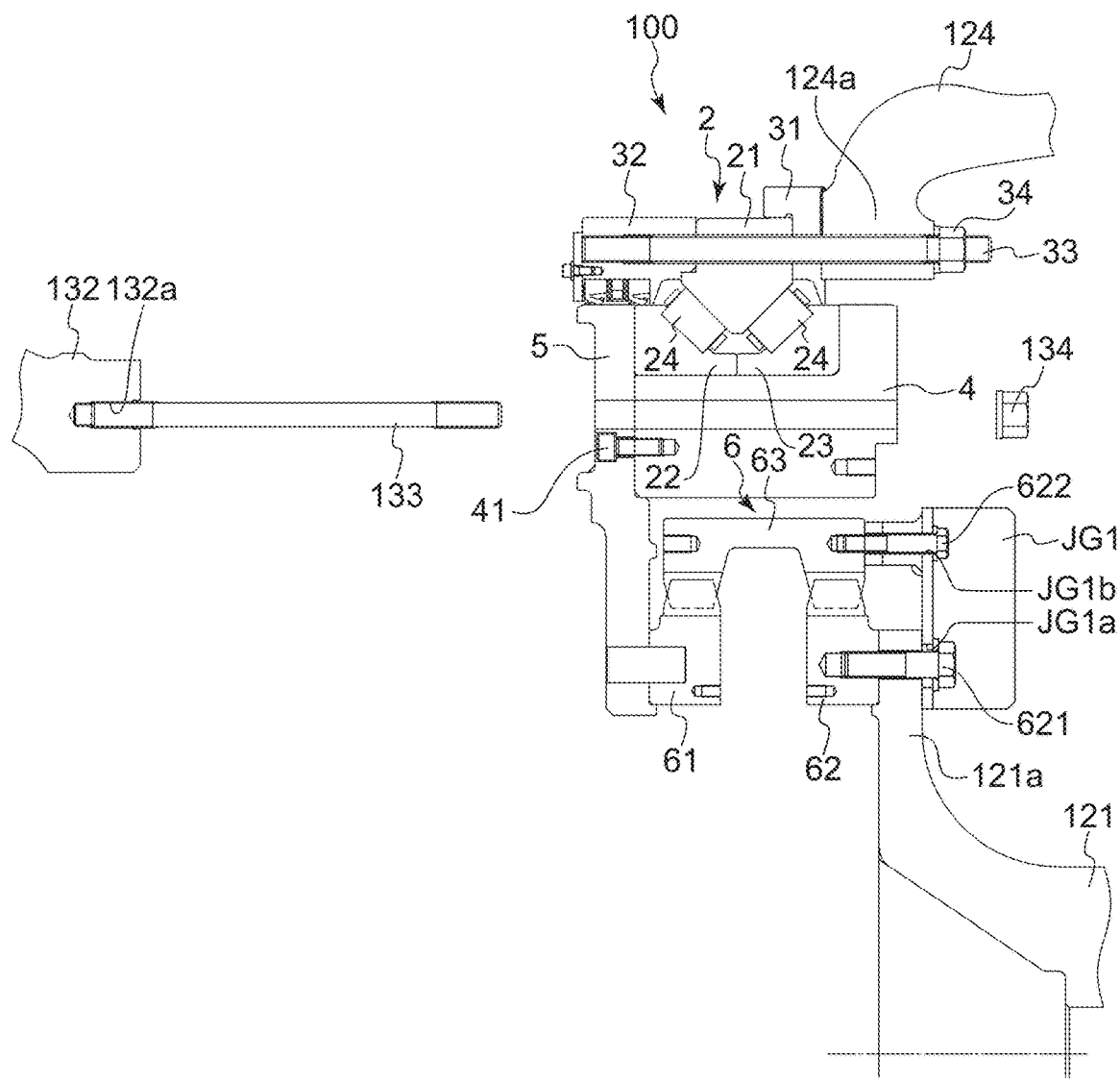
FIG. 8 is a diagram showing the state where the rotor head is removed from the wind turbine power generation facility (state before the rotor head is mounted on the wind turbine power generation facility).

The rotor head removal step (step S13A) is a step of removing the rotor head 132 from the main bearing 2. The rotor head removal step (step S13A) includes a step of removing the rotor head 132 from the main bearing sleeve 4. As shown in FIG. 8, in the step of removing the rotor head 132 from the main bearing sleeve 4, the nut 134 is removed from the stud bolt 133 that penetrates the inner ring retainer 5 and the main bearing sleeve 4, and the rotor head 132 is pulled out along with the stud bolt 133. Thus, the rotor head 132 is removed from the main bearing sleeve 4 with the stud bolt 133 fitted and fixed to the rotor head 132.

The nacelle cover removal step (step S14) is a step of removing a nacelle cover 125 covering the nacelle 124 from the nacelle 124. In the nacelle cover removal step (step S14), for example, the nacelle cover 125 constituting the ceiling portion of the nacelle 124 (housing) is removed from the nacelle 124.

Figure 9:
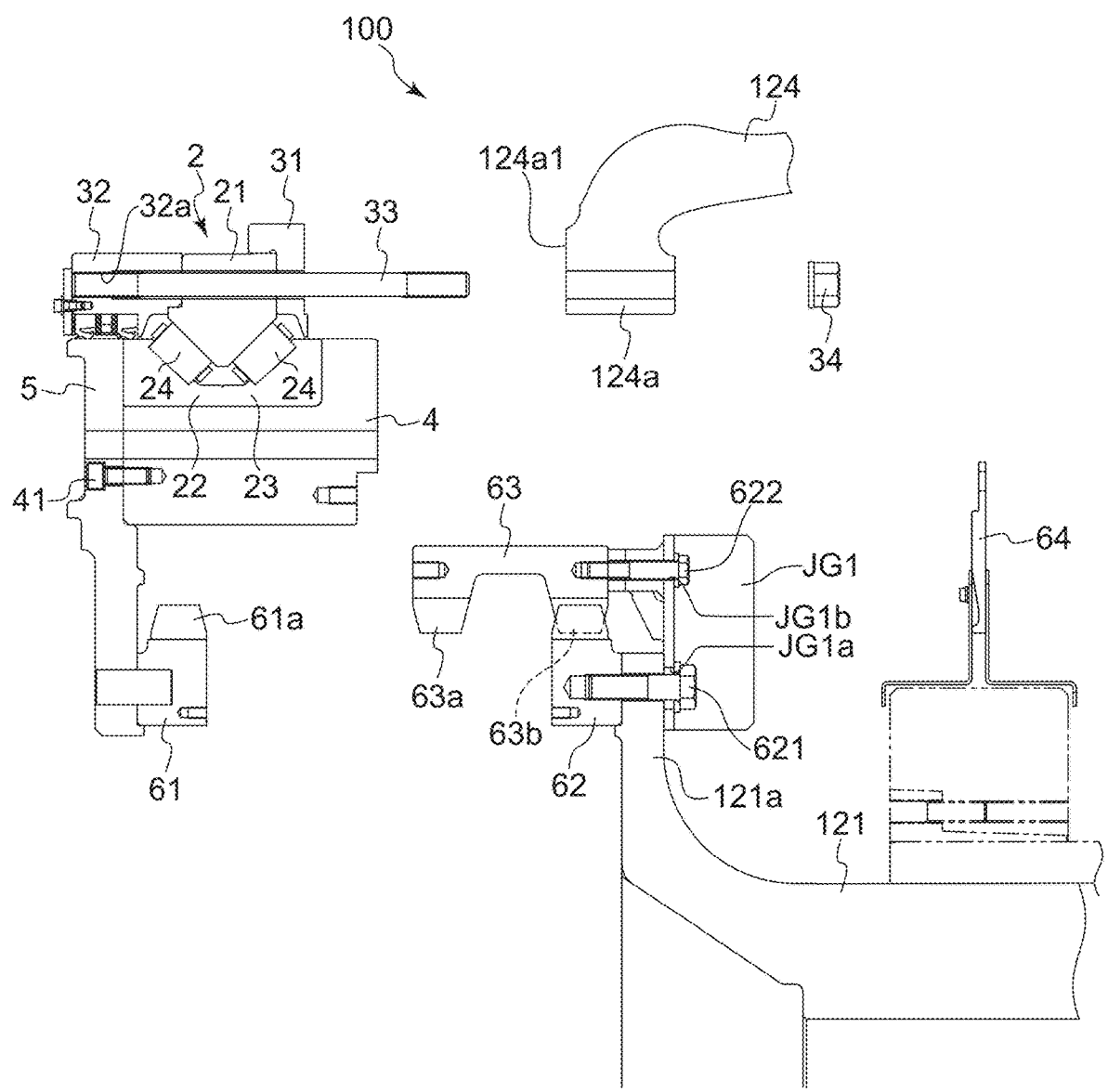
FIG. 9 is a diagram showing the state where the main bearing is removed from the wind turbine power generation facility (state before the main bearing is mounted on the wind turbine power generation facility).
Figure 10:
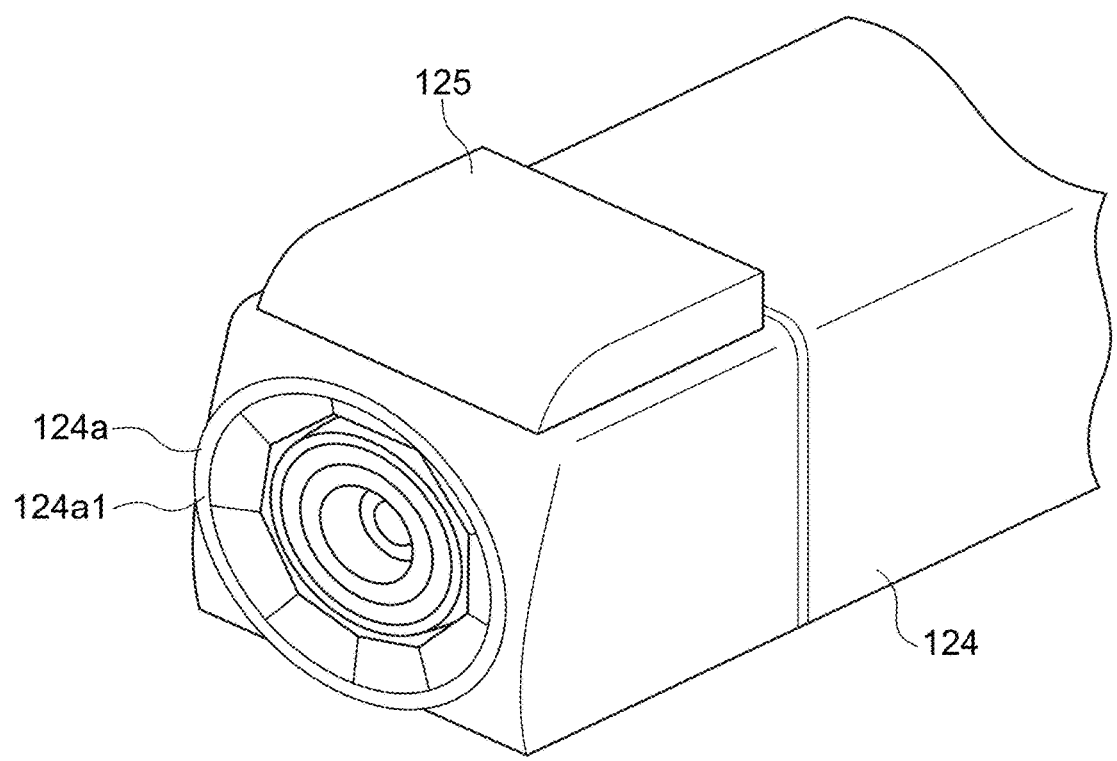
FIG. 10 is a schematic diagram of a nacelle cover constituting the ceiling portion of the nacelle.

The main bearing removal step (step S15) is a step of removing the main bearing 2 from the nacelle 124. The main bearing removal step (step S15) includes a step (step S151) of releasing connection between the rotor head 132 and the drive shaft 121, and a step (step S152) of removing the main bearing 2 from the nacelle 124. As shown in FIG. 9, in the step of removing the main bearing 2 from the nacelle 124, the main bearing 2 is removed at least while the main bearing sleeve 4 is fitted and fixed to the inner rings 22, 23 of the main bearing 2.

For example, the main bearing 2 is removed from the nacelle 124 while the main bearing sleeve 4 is fitted and fixed to the inner rings 22, 23 of the main bearing 2, the inner ring retainer 5 is fixed to the main bearing sleeve 4, and the inner ring 61 (hereinafter, referred to as "rotor-side inner ring 61") is fixed to the inner ring retainer 5. At this time, the drive shaft-side inner ring 62 is kept fixed to the drive shaft 121, and the outer ring 63 is kept connected to the drive shaft-side inner ring 62. In the step of removing the main bearing 2 from the nacelle 124, the nut 34 is removed from the stud bolt 33 that penetrates the outer ring 21 of the main bearing 2, the nacelle-side retainer 31, and the nacelle side surface portion (nacelle base plate) 124a of the nacelle 124, and the main bearing 2 is pulled out along with the stud bolt 33 to remove the main bearing 2 from the nacelle 124 while the main bearing sleeve 4, the inner ring retainer 5, and the rotor-side inner ring 61 are fixed. Thus, the main bearing 2, the main bearing sleeve 4, the inner ring retainer 5, and the rotor-side inner ring 61 are removed, connection between the rotor head 132 and the drive shaft 121 is released, and the main bearing 2 is removed from the nacelle 124.

Figure 4B:
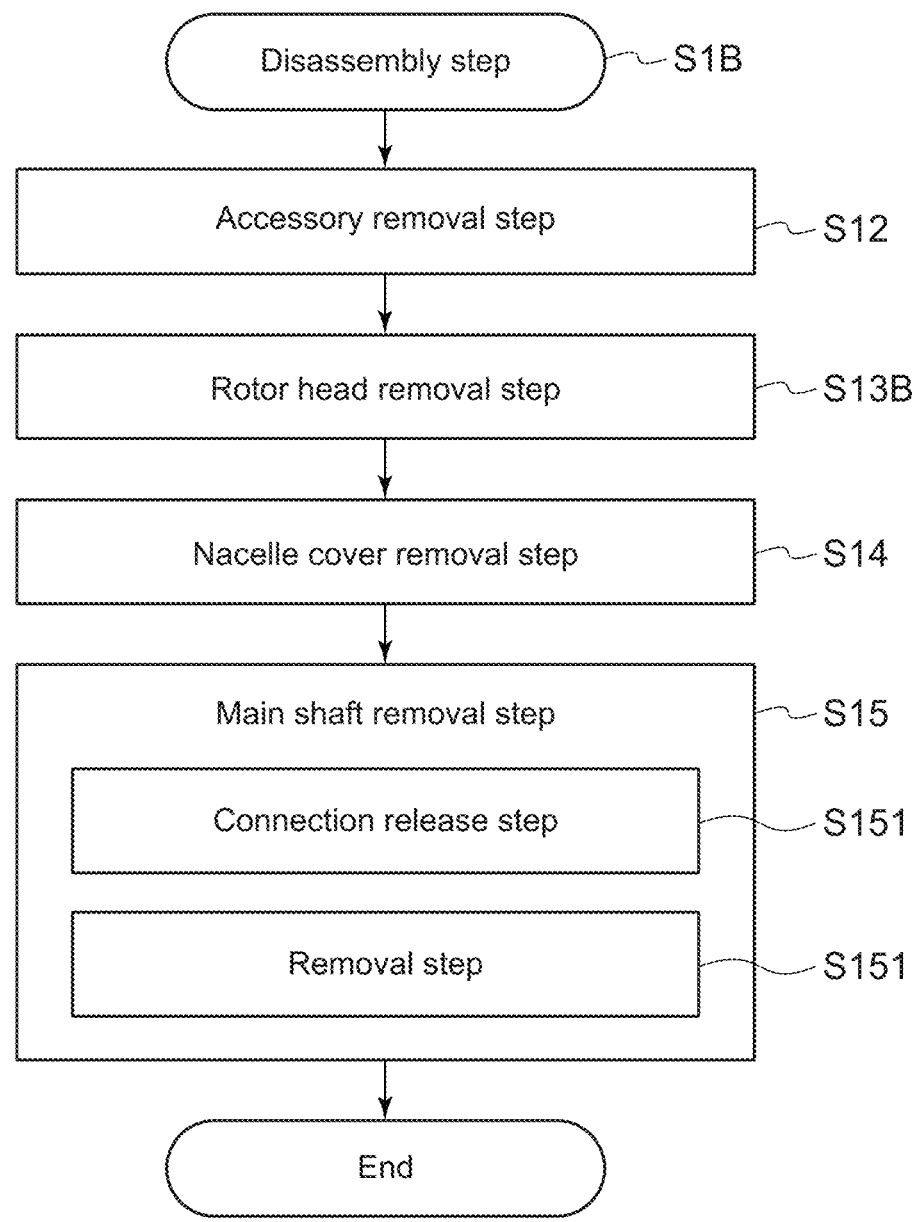
FIG. 4B is a schematic flowchart of the second disassembly step included in the main bearing replacement method for a wind turbine power generation facility according to an embodiment.

The second disassembly step (step S1B) differs from the first disassembly step (step S1A) in that the rotor head 132 is removed from the main bearing 2 with the plurality of wind turbine blades 131 mounted on the rotor head 132. As shown in FIG. 4B, the blade removal step is included in the rotor head removal step (step 13B), and the method does not include an independent blade removal step. The second disassembly step (step S1B) includes an accessory removal step (step S12), a rotor head removal step (step S13B), a nacelle cover removal step (step S14), and a main bearing removal step (step S15). The accessory removal step (step S12), the nacelle cover removal step (step S14), and the main bearing removal step (step S15) are identical to those in the first disassembly step (step S1A), and the same reference sign is used to omit the explanation, and only the rotor head removal step (step S13B) will be described.

The rotor head removal step (step S13B) is a step of removing the rotor head 132 from the main bearing 2 with the plurality of wind turbine blades 131 mounted on the rotor head 132. The rotor head removal step (step S13B) includes a step of removing the rotor head 132 from the main bearing sleeve. In the step of removing the rotor head 132 from the main bearing sleeve, for example, the wind turbine blades 131 are rotated to the position where they form the letter Y, and while the rotor head 132 is lifted by a dedicated rotor head lifting tool, the nut 134 is removed from the stud bolt 133 that penetrates the inner ring retainer 5 and the main bearing sleeve 4, and the rotor head 132 is pulled out along with the stud bolt 133 (see FIG. 8). Thus, the rotor head 132 is removed from the main bearing sleeve 4 with the plurality of wind turbine blades 131 mounted on the rotor head 132 and the stud bolt 133 fitted and fixed to the rotor head 132.

[Main Bearing Replacement Method for Wind Turbine Power Generation Facility: Mounting Surface Treatment Step and Coating Step]

The main bearing replacement method for a wind turbine power generation facility 100 according to an embodiment may include a mounting surface treatment step and a coating step between the disassembly step (step S1) and the assembly step (step S3). The mounting surface treatment step is a step of treating surface roughness of the mounting surface 124a1 of the nacelle 124 on which the main bearing 2 is mounted. In the mounting surface treatment step, at least one of the following operations is performed: removing the coating from the mounting surface 124a1; and blasting the mounting surface 124a1. These processes are performed in midair without lowering the nacelle 124 to the ground. The coating step is, for example, to increase the coefficient of friction between the mounting surface 124a1 and the main bearing 2, and the mounting surface 124a1 on which the main bearing 2 is mounted is coated. The coating thickness is controlled when coating the mounting surface 124a1.

[Main Bearing Replacement Method for Wind Turbine Power Generation Facility: Assembly Step]

FIG. 5 are schematic flowcharts of the assembly step (step S3) included in the main bearing replacement method for a wind turbine power generation facility 100 according to an embodiment. For the assembly step (step S3), either one of the two assembly steps (steps S3A and S3B) can be selected depending on the local conditions.

Figure 5A:
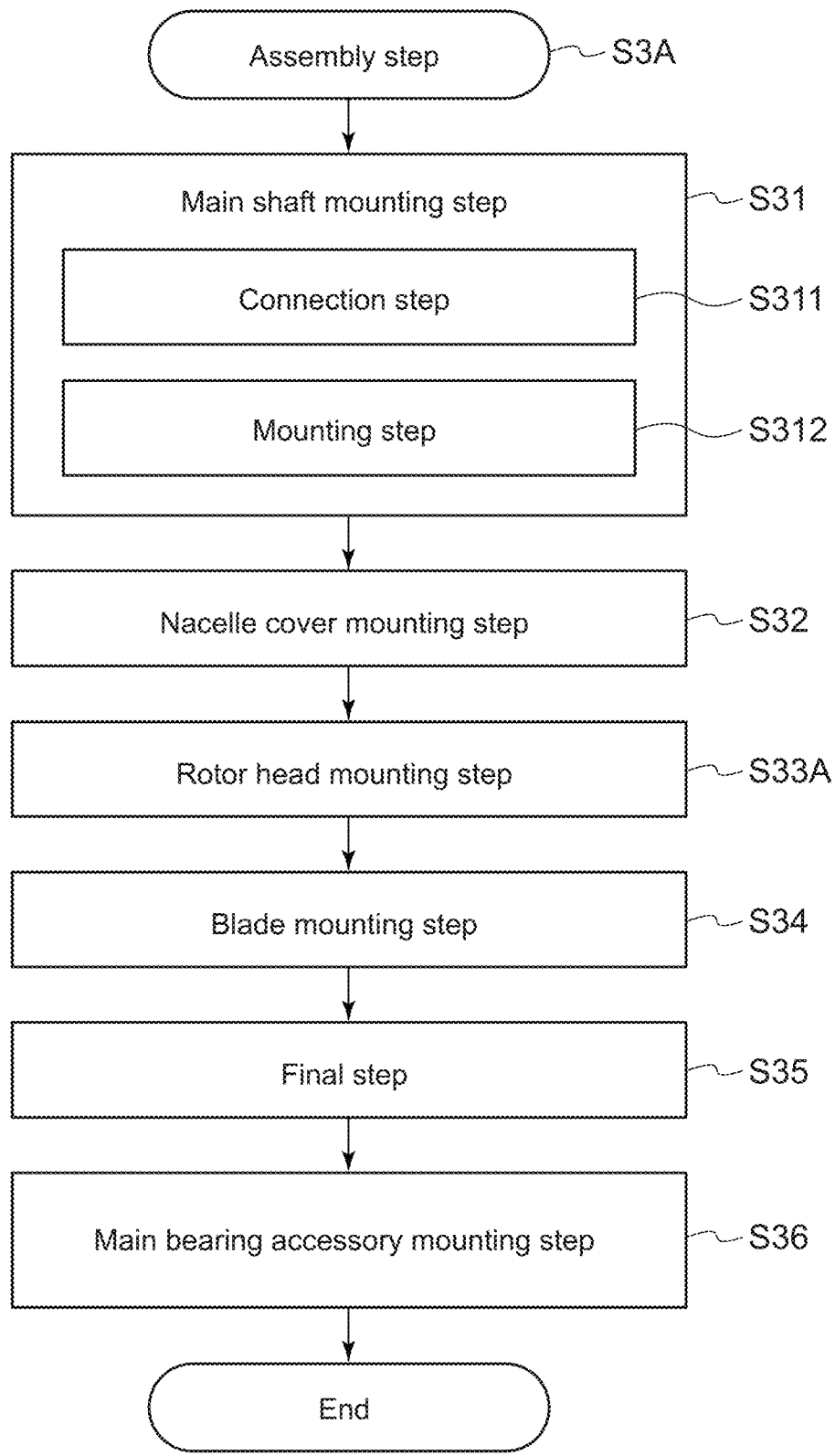
FIG. 5A is a schematic flowchart of the first assembly step included in the main bearing replacement method for a wind turbine power generation facility according to an embodiment.

As shown in FIG. 5A, the first assembly step (step S3A) includes a main bearing mounting step (step S31), a nacelle cover mounting step (step S32), a rotor head mounting step (step S33), a blade mounting step (step S34), a final step (step (S35), and a main bearing accessory mounting step (step S36).

The main bearing mounting step (step S31) is a step of mounting the main bearing 2 on the nacelle 124. The main bearing mounting step (step S31) includes a step (step S311) of connecting the rotor head 132 and the drive shaft 121, and a step (step S312) of mounting the main bearing 2 on the nacelle 124. As shown in FIG. 9, in the step (step S312) of mounting the main bearing 2, the main bearing 2 is mounted at least while the main bearing sleeve 4 is fitted and fixed to the inner rings 22, 23 of the main bearing 2.

Figure 11:
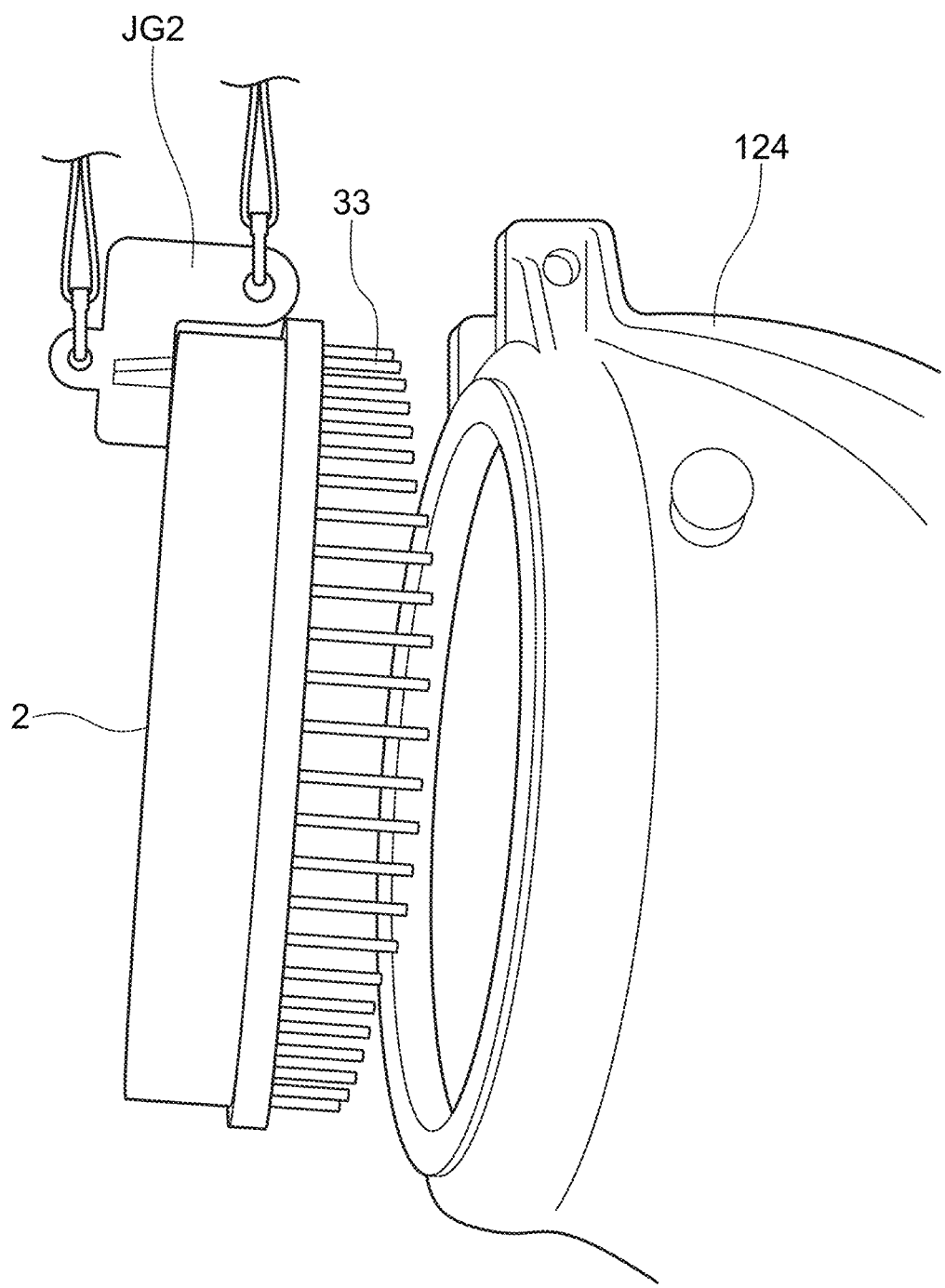
FIG. 11 is a diagram showing the state where the main bearing is lifted by a jig capable of adjusting the posture of the main bearing.

For example, the main bearing 2 is mounted while the main bearing sleeve 4 is fitted and fixed to the inner rings 22, 23 of the main bearing 2, the inner ring retainer 5 is fixed to the main bearing sleeve 4, and the rotor-side inner ring 61 is fixed to the drive shaft side of the inner ring retainer 5. For example, as shown in FIG. 11, the main bearing 2 is lifted by a lifting jig JG2 capable of adjusting the main bearing 2 to a posture where the main bearing 2 is fixed to the nacelle 124 while lifting the main bearing 2. In the example shown in FIG. 11, the main bearing 2 is lifted while the outer ring 21 of the main bearing 2 is fitted and fixed to the nacelle-side retainer 31 and the rotor head-side retainer 32, and the stud bolt 33 fitted and fixed to the rotor head-side retainer 32 penetrates them. Then, the fixture posture to the nacelle 124 is adjusted while the main bearing 2 is lifted. Then, the rotor head 132 and the drive shaft 121 are connected, and the main bearing 2 is mounted on the nacelle 124. As shown in FIG. 8, in the step of mounting the main bearing 2 on the nacelle 124, the main bearing 2 is fixed to the nacelle 124 by inserting the stud bolt 33 fitted and fixed to the rotor head-side retainer 32 into the nacelle side surface portion 124a of the nacelle 124 and fitting it to the nut 34.

In the main bearing mounting step (step S31), the fixation of the outer ring 63 is released, and the gear coupling holding plate 64 and the oil seal 27 are mounted, but these processes may be performed after the blade mounting step (step S34).

The nacelle cover mounting step (step S32) is a step of mounting a nacelle cover 125 covering the nacelle 124 on the nacelle 124. In the nacelle cover mounting step (step S32), for example, the nacelle cover 125 constituting the ceiling portion of the nacelle 124 (housing) is mounted. Further, in the nacelle cover mounting step (step S32), silicone is applied to the seam between the nacelle 124 and the nacelle cover 125.

The rotor head mounting step (step S33A) is a step of mounting the rotor head 132 on the main bearing 2. The rotor head mounting step (step S33A) includes a step of mounting the rotor head 132 on the main bearing sleeve 4. As shown in FIG. 7, in the step of mounting the rotor head 132 on the main bearing sleeve 4, the stud bolt 133 fitted and fixed to the rotor head 132 is inserted into the inner ring retainer 5 and the main bearing sleeve 4, and the nut 134 is fitted and fixed thereto. Thus, the rotor head 132 is mounted on the main bearing sleeve 4.

The blade mounting step (step S34) is a step of mounting the plurality of wind turbine blades 131 on the rotor head 132 sequentially. In the blade mounting step (step S34), for example, the wind turbine blades 131 are mounted one by one in a horizontal position using a dedicated blade lifting beam.

The final step (step S35) is a step of performing alignment adjustment of the coupling 6. The alignment process includes, for example, alignment of the gear coupling, installation of the coupling seal 65 and bellows 66, and grease lubrication.

As shown in FIG. 6, the main bearing accessory mounting step (step S36) is a step of mounting the accessory of the main bearing 2 on the main bearing 2.

Figure 5B:
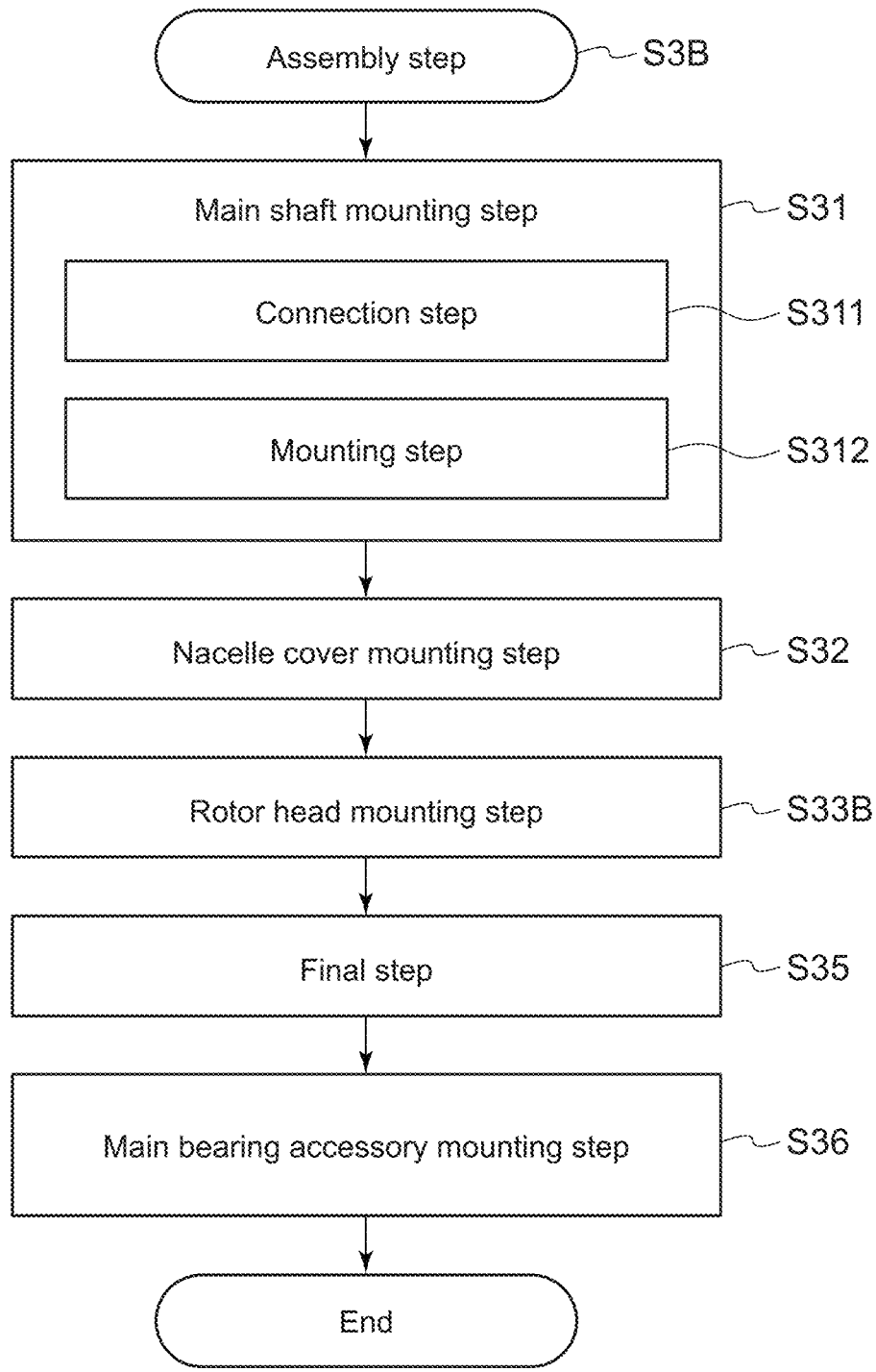
FIG. 5B is a schematic flowchart of the second assembly step included in the main bearing replacement method for a wind turbine power generation facility according to an embodiment.

The second assembly step (step S3B) differs from the first assembly step (step S1B) in that the rotor head 132 is mounted on the main bearing with the plurality of wind turbine blades 131 mounted on the rotor head 132. As shown in FIG. 5B, the blade mounting step is included in the rotor head mounting step (step S33A), and the method does not include an independent blade mounting step. The second assembly step (step S3B) includes a main bearing mounting step (step S31), a nacelle cover mounting step (step S32), a rotor head mounting step (step S33B), a final step (step (S35), and a main bearing accessory mounting step (step S36). The main bearing mounting step (step S31), the nacelle cover mounting step (step S32), the final step (step S35), and the main bearing accessory mounting step (step S36) are identical to those in the first assembly step (step S3A), and the same reference sign is used to omit the explanation, and only the rotor head mounting step (step S33B) will be described.

The rotor head mounting step (step S33B) is a step of mounting the rotor head 132 on the main bearing with the plurality of wind turbine blades 131 mounted on the rotor head 132. The rotor head mounting step (step S33B) includes a step of mounting the rotor head 132 on the main bearing sleeve. In the step of mounting the rotor head 132 on the main bearing sleeve 4, for example, while the rotor head 132 is lifted by a dedicated rotor head lifting tool with the plurality of wind turbine blades 131 mounted on the rotor head 132, the stud bolt 133 fitted and fixed to the rotor head 132 is inserted into the inner ring retainer 5 and the main bearing sleeve 4, and the nut 134 is fitted and fixed thereto (see FIG. 7). Thus, the rotor head 132 is mounted on the main bearing sleeve 4 with the plurality of wind turbine blades 131 mounted on the rotor head 132.

With the main bearing replacement method for a wind turbine power generation facility 100 according to the above-described embodiments, since the main bearing 2 is replaced at least while the main bearing sleeve 4 is fitted and fixed to the inner ring 22, 23 of the main bearing 2, the main bearing 2 can be efficiently replaced without removing the main bearing sleeve 4 from the inner ring 22, 23 of the main bearing 2 in midair.

Further, since the main bearing 2 is replaced while the inner ring retainer 5 is fixed to the main bearing sleeve 4 and the rotor-side inner ring 61 is fixed to the drive shaft side of the inner ring retainer 5, the main bearing 2 can be efficiently replaced without removing the inner ring retainer 5 from the main bearing sleeve 4 in midair.

Further, since the main bearing 2 is replaced while the drive shaft-side inner ring 62 is fixed to the drive shaft 121 and the outer ring 63 is connected to the drive shaft-side inner ring 62, the main bearing 2 can be replaced without lowering the drive shaft-side inner ring 62 and the outer ring 63 to the ground.

Further, the main bearing 2 can be removed from the nacelle 124 by performing the step of removing the plurality of wind turbine blades 131 sequentially from the rotor head 132, the step of removing the accessory of the main bearing 2 from the main bearing 2, the step of removing the rotor head 132 from the main bearing 2, the step of removing the nacelle cover 125 covering the nacelle 124 from the nacelle 124, and the step of removing the main bearing 2 from the nacelle 124 in this order.

Further, since the outer ring 63 constituting the coupling 6 is fixed to the drive shaft-side inner ring 62 constituting the coupling 6 in the accessory removal step (step S12) of removing the main bearing accessory, it is possible to prevent the outer ring 63 from falling out of the drive shaft-side inner ring 62 to the ground.

Further, since the rotor head removal step (step S13A, S13B) includes the step of removing the rotor head 132 from the main bearing sleeve 4, the main bearing 2 can be removed from the nacelle 124 after removing the rotor head 132 from the main bearing 2.

Further, in the main bearing removal step, connection between the rotor head 132 and the drive shaft 121 is released, and the main bearing 2 is removed from the nacelle 124.

Further, in the accessory removal step (step S12) of removing the main bearing accessory, at least the coupling seal 65, the bellows 66, and the oil seal 27 are removed.

Further, since the mounting surface treatment step and the coating step are performed in midair, the need to lower the nacelle 124 to the ground is eliminated, and the construction period is shortened.

Further, since the mounting surface treatment step includes blasting, the surface roughness of the mounting surface 124a1 can be made suitable for coating in midair.

Further, the main bearing 2 can be assembled on the nacelle 124 by performing the step of mounting the main bearing on the nacelle 124, the step of mounting the nacelle cover 125 covering the nacelle 124 on the nacelle 124, the step of mounting the rotor head 132 on the main bearing 2, the step of mounting the plurality of wind turbine blades 131 sequentially on the rotor head 132, the step of performing alignment adjustment of the coupling 6, and the step of mounting the accessory of the main bearing 2 on the main bearing 2 in this order.

Further, since the main bearing 2 is lifted by the lifting jig (JG2) capable of adjusting the main bearing 2 to a posture where the main bearing 2 is fixed to the nacelle 124 while lifting the main bearing 2, the main bearing 2 is adjusted to the fixture posture to the nacelle 124 while the lifting jig lifts the main bearing 2.

Further, the main bearing 2 is adjusted to a posture where the main bearing 2 is fixed to the nacelle 124 while the main bearing 2 is lifted, the main bearing 2 is adjusted to the fixture posture to the nacelle 124 while the main bearing 2 is lifted.

The present invention is not limited to the embodiments described above, but includes modifications to the embodiments described above, and embodiments composed of combinations of those embodiments.

The contents described in the above embodiments would be understood as follows, for instance.

[1] A main bearing replacement method for a wind turbine power generation facility (100) according to an aspect is a main bearing replacement method for a wind turbine power generation facility (100) including a nacelle (124), a rotor head (132) rotatably supported by the nacelle (124), a drive shaft (121) to which rotation of the rotor head (132) is transmitted, a main bearing (2) disposed between the rotor head (132) and the nacelle (124), and a coupling (6) connecting the rotor head (132) and the drive shaft (121) on a radially inner side of the main bearing (2). The wind turbine power generation facility (100) includes a main bearing sleeve (4) fitted and fixed to an inner ring (22, 23) of the main bearing (2) and mounted with the rotor head (132). The main bearing (2) is replaced at least while the main bearing sleeve (4) is fitted and fixed to the inner ring (22, 23) of the main bearing (2).

With this method, since the main bearing (2) is replaced at least while the main bearing sleeve (4) is fitted and fixed to the inner ring (22, 23) of the main bearing (2), the main bearing (2) can be efficiently replaced without removing the main bearing sleeve (4) from the inner ring (22, 23) of the main bearing (2) in midair.

[2] A main bearing replacement method for a wind turbine power generation facility (100) according to another aspect is the main bearing replacement method for a wind turbine power generation facility (100) described in [1] in which the wind turbine power generation facility (100) includes an inner ring retainer (5) disposed between the rotor head (132) and the main bearing sleeve (4) and fixed to the main bearing sleeve (4), and a rotor-side inner ring (61) fixed to the inner ring retainer (5) and constituting the coupling (6). The main bearing (2) is replaced while the inner ring retainer (5) is fixed to the main bearing sleeve (4) and the rotor-side inner ring (61) is fixed to the inner ring retainer (5).

With this method, since the main bearing (2) is replaced while the inner ring retainer (5) is fixed to the main bearing sleeve (4) and the rotor-side inner ring (61) is fixed to the drive shaft side of the inner ring retainer (5), the main bearing (2) can be efficiently replaced without removing the inner ring retainer (5) from the main bearing sleeve (4) in midair.

[3] A main bearing replacement method for a wind turbine power generation facility (100) according to another aspect is the main bearing replacement method for a wind turbine power generation facility (100) described in [2] in which the wind turbine power generation facility (100) includes a drive shaft-side inner ring (62) fixed to the drive shaft (121) and constituting the coupling (6), and an outer ring (63) connected to the rotor-side inner ring (61) and the drive shaft-side inner ring (62) and constituting the coupling (6). The drive shaft-side inner ring (62) is kept fixed to the drive shaft (121) and the outer ring (63) is kept connected to the drive shaft-side inner ring (62) during replacement of the main bearing (2).

With this method, since the main bearing (2) is replaced while the drive shaft-side inner ring (62) is fixed to the drive shaft (121) and the outer ring (63) is connected to the drive shaft-side inner ring (62), the main bearing (2) can be replaced without lowering the drive shaft-side inner ring (62) and the outer ring (63) to the ground.

[4] A main bearing replacement method for a wind turbine power generation facility (100) according to another aspect is the main bearing replacement method for a wind turbine power generation facility (100) described in any one of [1] to [3] in which the wind turbine power generation facility (100) includes a main bearing accessory including an oil seal (27) sealing between the inner ring (23) and an outer ring (21) of the main bearing (2), and a coupling accessory including a bellows (66) disposed on a radially inner side of the coupling (6), and a coupling seal (65) shielding the coupling (6) from outside. The main bearing replacement method comprises a disassembly step (step S1) including a blade removal step (step S11) of removing a plurality of wind turbine blades (131) sequentially from the rotor head (132), an accessory removal step (step S12) of removing the main bearing accessory from the main bearing (2) and removing the coupling accessory from the coupling (6), a rotor head removal step (step S13A) of removing the rotor head (132) from the main bearing (2), a nacelle cover removal step (step S14) of removing a nacelle cover (125) covering the nacelle (124) from the nacelle (124), and a main bearing removal step (step S15) of removing the main bearing (2) from the nacelle (124).

With this method, the main bearing (2) can be removed from the nacelle (124) by performing the step (step S11) of removing the plurality of wind turbine blades (131) sequentially from the rotor head (132), the step (step S12) of removing the main bearing accessory from the main bearing (2) and removing the coupling accessory from the coupling (6), the step (step S13A) of removing the rotor head (132) from the main bearing (2), the step (step S14) of removing the nacelle cover (125) covering the nacelle (124) from the nacelle (124), and the step (step S15) of removing the main bearing from the nacelle (124) in this order.

[5] A main bearing replacement method for a wind turbine power generation facility (100) according to another aspect is the main bearing replacement method for a wind turbine power generation facility (100) described in any one of [1] to [3] in which the wind turbine power generation facility (100) includes a main bearing accessory including an oil seal (27) sealing between the inner ring (23) and an outer ring (21) of the main bearing (2), and a coupling accessory including a bellows (66) disposed on a radially inner side of the coupling (6), and a coupling seal (65) shielding the coupling (6) from outside. The main bearing replacement method comprises a disassembly step including an accessory removal step (step S12) of removing the main bearing accessory from the main bearing (2) and removing the coupling accessory from the coupling (6), a rotor head removal step (step S13B) of removing the rotor head (132) from the main bearing (2) with a plurality of wind turbine blades (131) mounted on the rotor head (132), a nacelle cover removal step (step S14) of removing a nacelle cover covering the nacelle from the nacelle, and a main bearing removal step (step S15) of removing the main bearing from the nacelle.

With this method, the main bearing (2) can be removed from the nacelle (124) by performing the step (step S12) of removing the main bearing accessory from the main bearing (2) and removing the coupling accessory from the coupling (6), the step (step S13B) of removing the rotor head (132) from the main bearing (2) with the plurality of wind turbine blades (131) mounted on the rotor head (132), the step (step S14) of removing the nacelle cover (125) covering the nacelle (124) from the nacelle (124), and the step (step S15) of removing the main bearing (2) from the nacelle (124) in this order.

[6] A main bearing replacement method for a wind turbine power generation facility (100) according to another aspect is the main bearing replacement method for a wind turbine power generation facility (100) described in [4] or [5] in which, in the accessory removal step (step S12) of removing the main bearing accessory, an outer ring (63) constituting the coupling (6) is fixed to a drive shaft-side inner ring (62) constituting the coupling (6).

With this method, since the outer ring (63) constituting the coupling (6) is fixed to the drive shaft-side inner ring (62) constituting the coupling (6) in the accessory removal step (step S12) of removing the main bearing accessory, it is possible to prevent the outer ring (63) from falling out of the drive shaft-side inner ring (62) to the ground.

[7] A main bearing replacement method for a wind turbine power generation facility (100) according to another aspect is the main bearing replacement method for a wind turbine power generation facility (100) described in any one of [4] to [6] in which the rotor head removal step (step S13A, S13B) includes a step of removing the rotor head (132) from the main bearing sleeve (4).

With this method, since the rotor head removal step (step S13A, S13B) includes the step of removing the rotor head (132) from the main bearing sleeve (4), the main bearing (2) can be removed from the nacelle (124) after removing the rotor head (132) from the main bearing (2).

[8] A main bearing replacement method for a wind turbine power generation facility (100) according to another aspect is the main bearing replacement method for a wind turbine power generation facility (100) described in any one of [4] to [7] in which the main bearing removal step (step S15) includes a step (step S151) of releasing connection between the rotor head (132) and the drive shaft (121), and a step (step S152) of removing the main bearing (2) from the nacelle (124).

With this method, in the main bearing removal step (step S15), connection between the rotor head (132) and the drive shaft (121) is released, and the main bearing (2) is removed from the nacelle (124).

[9] A main bearing replacement method for a wind turbine power generation facility (100) according to another aspect is the main bearing replacement method for a wind turbine power generation facility (100) described in any one of [4] to [8] in which, in the accessory removal step (step S12), at least the coupling seal (65), the bellows (66), and the oil seal (27) are removed.

With this method, in the accessory removal step (step S12), at least the coupling seal (65), the bellows (66), and the oil seal (27) are removed.

[10] A main bearing replacement method for a wind turbine power generation facility (100) according to another aspect is the main bearing replacement method for a wind turbine power generation facility (100) described in any one of [4] to [9] which comprises a mounting surface treatment step of treating surface roughness of a mounting surface (124al) of the nacelle (124) on which the main bearing (2) is mounted, and a coating step of coating the mounting surface (124al) treated in the mounting surface treatment step. The mounting surface treatment step and the coating step are performed in midair.

With this method, since the mounting surface treatment step and the coating step are performed in midair, the need to lower the nacelle (124) to the ground is eliminated, and the construction period is shortened.

[11] A main bearing replacement method for a wind turbine power generation facility (100) according to another aspect is the main bearing replacement method for a wind turbine power generation facility (100) described in [10] in which the mounting surface treatment step includes blasting.

With this method, the surface roughness of the mounting surface (124al) can be made suitable for coating in midair.

[12] A main bearing replacement method for a wind turbine power generation facility (100) according to another aspect is the main bearing replacement method for a wind turbine power generation facility (100) described in any one of [1] to [11] which comprises an assembly step including a main bearing mounting step (step S31) of mounting the main bearing (2) on the nacelle (124), a nacelle cover mounting step (step S32) of mounting a nacelle cover (125) covering the nacelle (124) on the nacelle (124), a rotor head mounting step (step S33A) of mounting the rotor head (132) on the main bearing (2), a blade mounting step (step S34) of mounting a plurality of wind turbine blades (131) sequentially on the rotor head (132), a final step (step S35) of performing alignment adjustment of the coupling (6), and a main bearing accessory mounting step (step S36) of mounting an accessory of the main bearing (2) on the main bearing (2).

With this method, the main bearing (2) can be assembled on the nacelle (124) by performing the step (step S31) of mounting the main bearing (2) on the nacelle (124), the step (step S32) of mounting the nacelle cover (125) covering the nacelle (124) on the nacelle (124), the step (step S33A) of mounting the rotor head (132) on the main bearing (2), the step (step S34) of mounting the plurality of wind turbine blades (131) sequentially on the rotor head (132), the step (step S35) of performing alignment adjustment of the coupling (6), and the step (step S36) of mounting the accessory of the main bearing (2) on the main bearing (2) in this order.

[13] A main bearing replacement method for a wind turbine power generation facility (100) according to another aspect is the main bearing replacement method for a wind turbine power generation facility (100) described in any one of [1] to [11] which comprises an assembly step including a main bearing mounting step (step S31) of mounting the main bearing (2) on the nacelle (124), a nacelle cover mounting step (step S32) of mounting a nacelle cover (125) covering the nacelle (124) on the nacelle (124), a rotor head mounting step (step S33B) of mounting the rotor head (132) on the main bearing (2) with a plurality of wind turbine blades (131) mounted on the rotor head (132), a final step (step S35) of performing alignment adjustment of the coupling (6), and a main bearing accessory mounting step (step S36) of mounting an accessory of the main bearing (2) on the main bearing (2).

With this method, the main bearing (2) can be assembled on the nacelle (124) by performing the step (step S31) of mounting the main bearing (2) on the nacelle (124), the step (step S32) of mounting the nacelle cover (125) covering the nacelle (124) on the nacelle (124), the step (step S33B) of mounting the rotor head (132) on the main bearing (2) with the plurality of wind turbine blades (131) mounted on the rotor head (132), the step (step S35) of performing alignment adjustment of the coupling (6), and the step (step S36) of mounting the accessory of the main bearing (2) on the main bearing (2) in this order.

[14] A main bearing replacement method for a wind turbine power generation facility (100) according to another aspect is the main bearing replacement method for a wind turbine power generation facility (100) described in any one of [1] to [13] in which the main bearing (2) is lifted by a lifting jig (JG2) capable of adjusting the main bearing to a posture where the main bearing (2) is fixed to the nacelle (124) while lifting the main bearing (2).

With this method, the main bearing (2) is adjusted to the fixture posture to the nacelle (124) while the lifting jig lifts the main bearing (2).

[15] A main bearing replacement method for a wind turbine power generation facility (100) according to another aspect is the main bearing replacement method for a wind turbine power generation facility (100) described in any one of [1] to [14] in which the main bearing (2) is adjusted to a posture where the main bearing (2) is fixed to the nacelle (124) while the main bearing (2) is lifted.

With this method, the main bearing (2) is adjusted to the fixture posture to the nacelle (124) while the main bearing (2) is lifted.

The invention claimed is:

1. A main bearing replacement method for a wind turbine power generation facility,
    wherein the wind turbine power generation facility comprises a nacelle; a rotor head rotatably supported by the nacelle, a drive shaft to which rotation of the rotor head is transmitted, a main bearing disposed between the rotor head and the nacelle, a coupling connecting the rotor head and the drive shaft on a radially inner side of the main bearing, a main bearing sleeve fitted and fixed to an inner ring of the main bearing and mounted with the rotor head, an inner ring retainer disposed between the rotor head and the main bearing sleeve and fixed to the main bearing sleeve, and a rotor-side inner ring fixed to the inner ring retainer and constituting the coupling,
    the main bearing replacement method comprising:
        replacing the main bearing by replacing at least while the main bearing sleeve is fitted and fixed to the inner ring of the main bearing,
        wherein in the replacing the main bearing step, the main bearing is replaced while the inner ring retainer is fixed to the main bearing sleeve and the rotor-side inner ring is fixed to the inner ring retainer.

2. The main bearing replacement method for the wind turbine power generation facility according to claim 1, wherein the wind turbine power generation facility further comprises
a drive shaft-side inner ring fixed to the drive shaft and constituting the coupling, and
an outer ring connected to the rotor-side inner ring and the drive shaft-side inner ring and constituting the coupling, and
wherein the drive shaft-side inner ring is kept fixed to the drive shaft and the outer ring is kept connected to the drive shaft-side inner ring during replacement of the main bearing.

3. A main bearing replacement method for a wind turbine power generation facility,
wherein the wind turbine power generation facility comprises a nacelle, a rotor head rotatably supported by the nacelle, a drive shaft to which rotation of the rotor head is transmitted, a main bearing disposed between the rotor head and the nacelle, a coupling connecting the rotor head and the drive shaft on a radially inner side of the main bearing, a main bearing sleeve fitted and fixed to an inner ring of the main bearing and mounted with the rotor head, a main bearing accessory including an oil seal sealing between the inner ring and an outer ring of the main bearing, and a coupling accessory including a bellows disposed on a radially inner side of the coupling, and a coupling seal shielding the coupling from outside,
the main bearing replacement method comprising:
replacing the main bearing by replacing at least while the main bearing sleeve is fitted and fixed to the inner ring of the main bearing, and
wherein the replacing the main bearing step further comprises a disassembly step comprising:
removing a plurality of wind turbine blades sequentially from the rotor head,
removing accessories by removing the main bearing accessory from the main bearing and removing the coupling accessory from the coupling,
removing the rotor head from the main bearing,
removing a nacelle cover covering the nacelle from the nacelle, and
removing the main bearing from the nacelle.

4. The main bearing replacement method for the wind turbine power generation facility according to claim 3,
wherein, in the removing the main bearing accessory step, an outer ring constituting the coupling is fixed to a drive shaft-side inner ring constituting the coupling.

5. The main bearing replacement method for the wind turbine power generation facility according to claim 3,
wherein the removing the rotor head comprises removing the rotor head from the main bearing sleeve.

6. The main bearing replacement method for the wind turbine power generation facility according to claim 3,
wherein the removing the main bearing comprises:
releasing connection between the rotor head and the drive shaft, and
removing the main bearing from the nacelle.

7. The main bearing replacement method for the wind turbine power generation facility according to claim 3,
wherein, in the removing the accessories, at least the coupling seal, the bellows, and the oil seal are removed.

8. The main bearing replacement method for the wind turbine power generation facility according to claim 3, comprising
a mounting surface treatment step of treating surface roughness of a mounting surface of the nacelle on which the main bearing is mounted, and
a coating step of coating the mounting surface treated in the mounting surface treatment step,
wherein the mounting surface treatment step and the coating step are performed in midair.

9. The main bearing replacement method for the wind turbine power generation facility according to claim 8,
wherein the mounting surface treatment step comprises blasting.

10. A main bearing replacement method for a wind turbine power generation facility,
wherein the wind turbine power generation facility comprises a nacelle, a rotor head rotatably supported by the nacelle, a drive shaft to which rotation of the rotor head is transmitted, a main bearing disposed between the rotor head and the nacelle, a coupling connecting the rotor head and the drive shaft on a radially inner side of the main bearing, a main bearing sleeve fitted and fixed to an inner ring of the main bearing and mounted with the rotor head, a main bearing accessory including an oil seal sealing between the inner ring and an outer ring of the main bearing, and a coupling accessory including a bellows disposed on a radially inner side of the coupling, and a coupling seal shielding the coupling from outside,
the main bearing replacement method comprising:
removing the main bearing accessory from the main bearing and removing the coupling accessory from the coupling,
removing the rotor head from the main bearing with a plurality of wind turbine blades mounted on the rotor head,
removing a nacelle cover covering the nacelle from the nacelle, and
removing the main bearing from the nacelle.

11. A main bearing replacement method for a wind turbine power generation facility,
wherein the wind turbine power generation facility comprises a nacelle, a rotor head rotatably supported by the nacelle, a drive shaft to which rotation of the rotor head is transmitted, a main bearing disposed between the rotor head and the nacelle, a coupling connecting the rotor head and the drive shaft on a radially inner side of the main bearing, a main bearing sleeve fitted and fixed to an inner ring of the main bearing and mounted with the rotor head,
the main bearing replacement method comprising:
replacing the main bearing by replacing at least while the main bearing sleeve is fitted and fixed to the inner ring of the main bearing,
wherein the replacing the main bearing step comprises an assembly step comprising
a main bearing mounting step of mounting the main bearing on the nacelle,
a nacelle cover mounting step of mounting a nacelle cover covering the nacelle on the nacelle,
a rotor head mounting step of mounting the rotor head on the main bearing,
a blade mounting step of mounting a plurality of wind turbine blades sequentially on the rotor head,
a final step of performing alignment adjustment of the coupling, and
a main bearing accessory mounting step of mounting an accessory of the main bearing on the main bearing.

12. A main bearing replacement method for a wind turbine power generation facility,
wherein the wind turbine power generation facility comprises a nacelle, a rotor head rotatably supported by the nacelle, a drive shaft to which rotation of the rotor head is transmitted, a main bearing disposed between the rotor head and the nacelle, a coupling connecting the rotor head and the drive shaft on a radially inner side of the main bearing, a main bearing sleeve fitted and fixed to an inner ring of the main bearing and mounted with the rotor head, the main bearing replacement method comprising:
 replacing the main bearing by replacing at least while the main bearing sleeve is fitted and fixed to the inner ring of the main bearing,
wherein the replacing the main bearing step comprises an assembly step including
 a main bearing mounting step of mounting the main bearing on the nacelle,
 a nacelle cover mounting step of mounting a nacelle cover covering the nacelle on the nacelle,
 a rotor head mounting step of mounting the rotor head on the main bearing with a plurality of wind turbine blades mounted on the rotor head,
 a final step of performing alignment adjustment of the coupling, and
 a main bearing accessory mounting step of mounting an accessory of the main bearing on the main bearing.

13. A main bearing replacement method for a wind turbine power generation facility,
wherein the wind turbine power generation facility comprises a nacelle, a rotor head rotatably supported by the nacelle, a drive shaft to which rotation of the rotor head is transmitted, a main bearing disposed between the rotor head and the nacelle, a coupling connecting the rotor head and the drive shaft on a radially inner side of the main bearing, a main bearing sleeve fitted and fixed to an inner ring of the main bearing and mounted with the rotor head, the main bearing replacement method comprising:
 replacing the main bearing by replacing at least while the main bearing sleeve is fitted and fixed to the inner ring of the main bearing,
wherein in the replacing the main bearing step, the main bearing is lifted by a lifting jig capable of adjusting the main bearing to a posture where the main bearing is fixed to the nacelle while lifting the main bearing.

14. A main bearing replacement method for a wind turbine power generation facility,
wherein the wind turbine power generation facility comprises a nacelle, a rotor head rotatably supported by the nacelle, a drive shaft to which rotation of the rotor head is transmitted, a main bearing disposed between the rotor head and the nacelle, a coupling connecting the rotor head and the drive shaft on a radially inner side of the main bearing, a main bearing sleeve fitted and fixed to an inner ring of the main bearing and mounted with the rotor head, the main bearing replacement method comprising:
 replacing the main bearing by replacing at least while the main bearing sleeve is fitted and fixed to the inner ring of the main bearing,
wherein in the replacing the main bearing step, the main bearing is adjusted to a posture where the main bearing is fixed to the nacelle while the main bearing is lifted.

\* \* \* \* \*